United States Patent [19]

Terry

[11] Patent Number: 4,910,717
[45] Date of Patent: Mar. 20, 1990

[54] APPARATUS FOR MEASURING DISTANCES

[75] Inventor: Christopher J. F. Terry, Upper Teddington, United Kingdom

[73] Assignee: Sonin, Inc., Scarsdale, N.Y.

[21] Appl. No.: 227,208

[22] Filed: Aug. 2, 1988

[30] Foreign Application Priority Data

Aug. 7, 1987 [GB] United Kingdom ............... 8718717

[51] Int. Cl.[4] .................................... G01S 15/00
[52] U.S. Cl. ..................................... 367/99; 367/910
[58] Field of Search ............... 367/98, 99, 127, 900, 367/901, 910

[56] References Cited

U.S. PATENT DOCUMENTS

| 3,004,707 | 10/1961 | Wilson | 367/99 |
| 3,454,922 | 7/1969 | Dory | 367/98 |
| 4,451,909 | 5/1984 | Kodera et al. | 367/99 |
| 4,464,738 | 8/1984 | Czajkowski | 367/900 |
| 4,581,726 | 4/1986 | Mankino et al. | |
| 4,644,513 | 2/1987 | Czajkowski | 367/99 |

FOREIGN PATENT DOCUMENTS

| 59-171876 | 8/1984 | Japan . |
| 2160321 | 12/1985 | United Kingdom . |
| 2161932 | 1/1986 | United Kingdom . |

Primary Examiner—Thomas H. Tarcza
Assistant Examiner—Daniel T. Pihulic
Attorney, Agent, or Firm—Pollock, Vande Sande & Priddy

[57] ABSTRACT

Apparatus for measuring distances comprising circuit for sending an acoustic signal to a distant location, the distance of which is to be measured, circuit for receiving back reflected acoustic energy, and electronic circuit means for eliminating spurious echoes by providing a threshold signal level above the signal level of said spurious echoes, and a timing circuit to time the interval between the transmission of the acoustic signal and receipt of the acoustic signal.

15 Claims, 11 Drawing Sheets

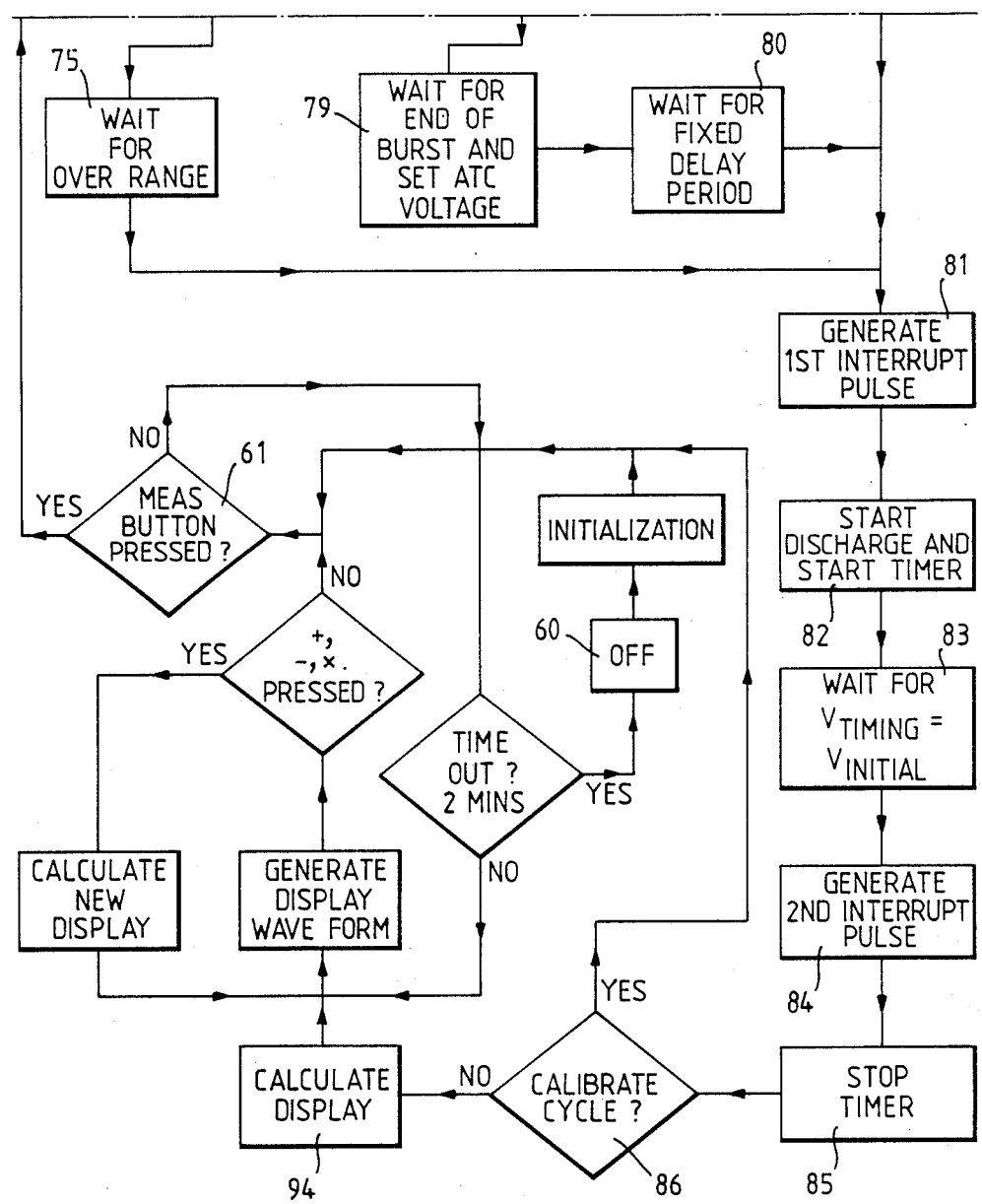
Fig.7cont.

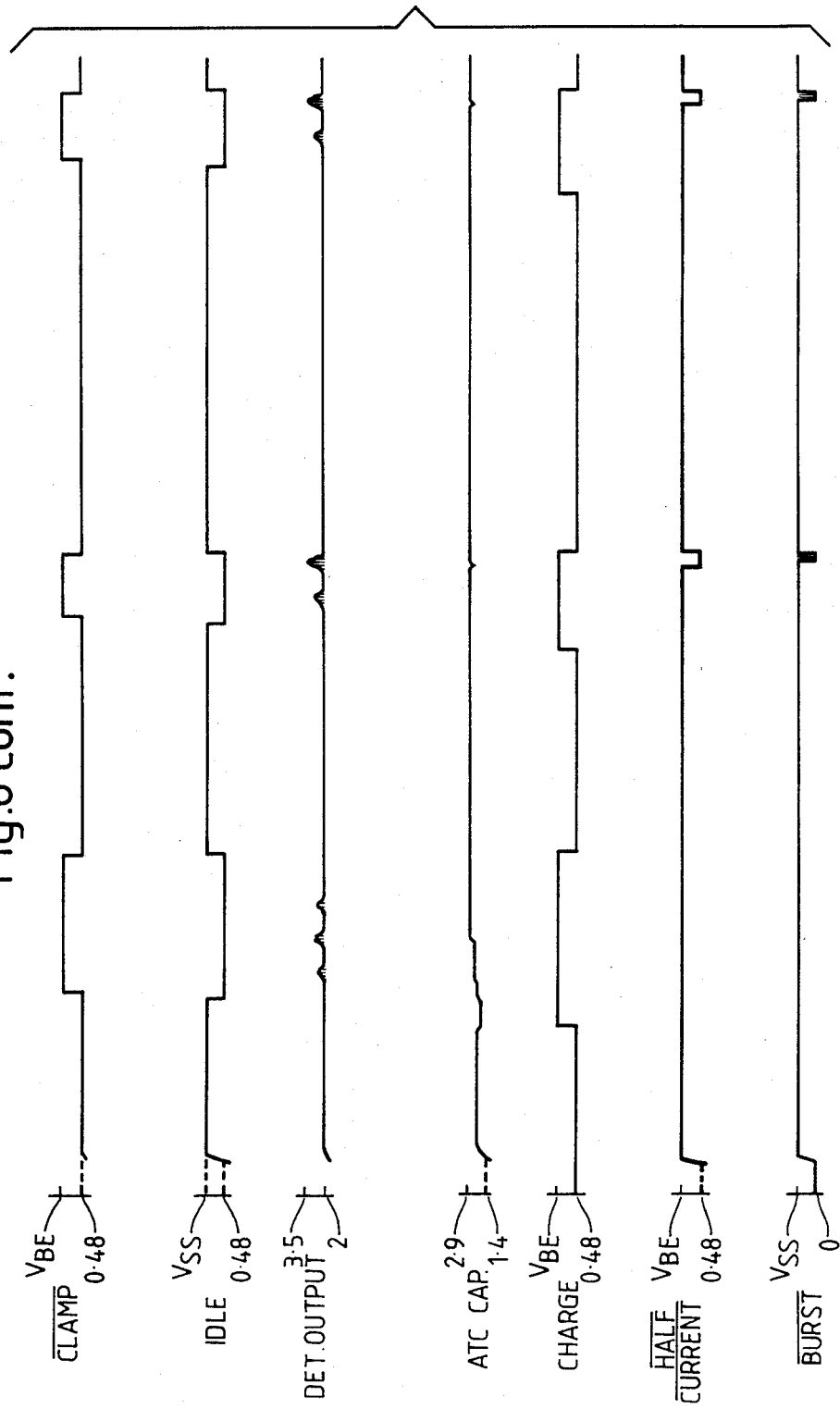

APPARATUS FOR MEASURING DISTANCES

BACKGROUND OF THE INVENTION

The present invention relates to apparatus for measuring distance. Specifically, an apparatus and method are disclosed for determining the two-way transit time of an acoustic wave between a measuring position and reflective surface.

Measuring distances by calculating the transit time of a pulsed acoustic wave from a measuring position to a reflective surface has been known in the art. One class of such measuring devices includes an ultrasonic transmitter which directs a beam of ultrasonic energy to a distant surface. The two-way transit time for the ultrasonic burst to leave the transmitter site and return via reflection from a distant surface is measured and converted to a distance measurement. One of the difficulties in using this technique is that reflections from surfaces other than the surface of interest are received, and are difficult to distinguish from a main reflection from a distant surface of interest. Thus, the received reflection typically includes unwanted echoes which originate from surfaces other than the true surface whose distance is to be measured.

One technique for reducing this problem includes the use of reflective acoustic horn structures which define a narrow beam of ultrasonic energy, and which are highly directive, and therefore reduce the spurious side reflections returned with the pulse of interest. However, such horns which generally rely on a focussing effect are not advantageous due to their size and attendant difficulty in positioning.

Other limitations in determining distances using reflected ultrasonic energy include the change of velocity of the reflected wave as the temperature of the propagating medium changes. Thus, a technique for accurately measuring the ambient temperature of the medium in which the reflected energy travels should be employed to correct for changes in velocity. The velocity of ultrasonic energy propagation in air at 20 degrees Celsius and 50% relative humidity changes at a rate of approximately 0.18% per degree Celsius, necessitating accurate compensation if distance measurement precision is required.

SUMMARY OF THE INVENTION

The present invention provides apparatus for measuring distances comprising:
an acoustic signal generator for directing a burst of ultrasonic frequency energy at a distant location;
an acoustic transducer for receiving a reflected burst of acoustic energy from said distant location;
a detector connected to said acoustic transducer, providing an electrical signal proportional to said reflected burst of acoustic energy, said electrical signal having a time varying amplitude envelope function defining a centroid and spurious echoes;
a threshold generator for generating a threshold signal equal to an amplitude value which exceeds the peak amplitude of said side lobes;
a comparator circuit means connected to receive said threshold signal, and a signal from said detector, said comparator providing a signal when said detector signal produces an envelope signal greater than said threshold signal; and
a timing circuit connected to time an interval which begins with the initiation of said burst of ultrasonic energy, and ends when said comparator circuit produces an output signal, said interval representing a distance transversed by said acoustic burst and related reflection.

The present invention provides apparatus for measuring distances comprising:
(a) an acoustic signal generator for directing a burst of ultrasonic frequency energy at a distant location;
(b) an acoustic transducer for receiving a reflected burst of acoustic energy from said distant location and producing an output signal proportional to the amplitude of said reflected burst of acoustic energy;
(c) a threshold detection circuit connected to said transducer for generating an output signal when said transducer produces an output signal in excess of a preestablished threshold voltage;
(d) a timing capacitor;
(e) a charging circuit connected to charge said capacitor at a predetermined charging rate, said charge being initiated when said burst is generated by said signal generator, and being concluded when said threshold detection circuit produces an output signal, whereby a voltage potential is stored on said timing capacitor proportional to a measured distance;
(f) a discharging circuit connected to discharge said timing capacitor at a fixed discharge rate;
(g) logic circuit connected to said discharging circuit for initiating a first interrupt pulse when said capacitor begins to discharge, and a second interrupt pulse when said capacitor discharges to an initial value;
(h) a microprocessor connected to receive said first and second interrupts, programmed to measure a time interval represented by first and second interrupt pulses, and convert said time interval into a distance measurement traversed by said burst of acoustic energy; and,
(i) a display connected to said microprocessor for displaying said distance measurement.

In carrying out the apparatus and method in accordance with the invention, we will describe apparatus for permitting the accurate measurement of the time of occurrence of the centroid of the main envelope of a reflected ultrasonic pulse. To accurately measure the position of the centroid, a threshold level is first established representing a level of signal which occurs before and after the peak of the main pulse envelope. Once such a threshold has been established, it is possible to detect the presence of the main echo and the time of occurrence of its geometric center may be measured.

In order to assist in the accurate detection of the main echo pulse, we prefer to employ a variable attenuator which is driven by a time varying signal so as to provide an overall gain which increases with time under a combination of exponential and linear functions. In this way, nearer reflections which are received sooner than more distant ones are subject to more attenuation than the more distant reflections. By careful choice of the time varying attenuation function, it is possible to keep the output of the attenuator within a small amplitude range, thus permitting distant reflections as well as near reflections to be examined with linear circuitry operating within a small dynamic range.

The attenuated signal may be first used in a calibration cycle to establish an optimum threshold level. By selecting a threshold level which is in a range of 50 to 80% typically approximately 75%, of the peak level, it is possible to distinguish the wanted echo from the side echoes.

The preferred arrangement of the present invention to be described employs a unique dual ramp timing system for normalising the two-way transit time of ultrasonic energy with respect to variations in propagation velocity. The unique dual ramp timing system employs a charging circuit which starts to charge a timing capacitor when the ultrasonic burst is transmitted. Upon receipt of an ultrasonic pulse whose amplitude exceeds the established threshold level, the charging current is reduced to one half its initial value. Following the fall of the amplitude below the established threshold level the timing capacitor charging circuit is switched off. Thus, the capacitor will contain a charge which is indicative of the distance travelled by the ultrasonic pulse with reference to a point half way between the rising and trailing edges of the echo pulse envelope.

In the preferred embodiment of the invention, to read the information contained in the capacitor relating to the distance traversed by the ultrasonic energy, a discharging circuit is employed which will discharge the timing capacitor to its original voltage using a precision controlled discharging current. The time required to discharge the capacitor to its original voltage constitutes the stored information relating to the two-way transit distance.

In the preferred embodiment of the invention, a technique is employed to quickly compensate the timing system for changes in outside ambient temperature. As the device is taken from one environment to another an abrupt change in ambient temperature on the outside of the device may be encountered. We provide for an estimation of the outside temperature which is used until the inside temperature of the apparatus has achieved equilibrium with the outside temperature.

Preferred embodiments of the invention will now be described by way of example only and with reference to the accompanying drawings.

DESCRIPTION OF THE PREFERRED EMBODIMENT

Figure 1:
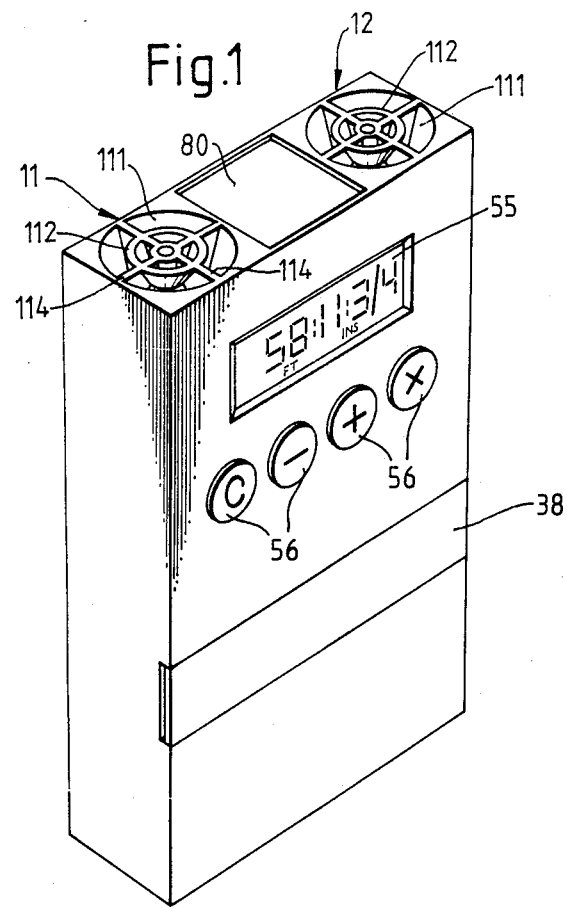
FIG. 1 is a front view of an apparatus according to the invention.
Figure 2:
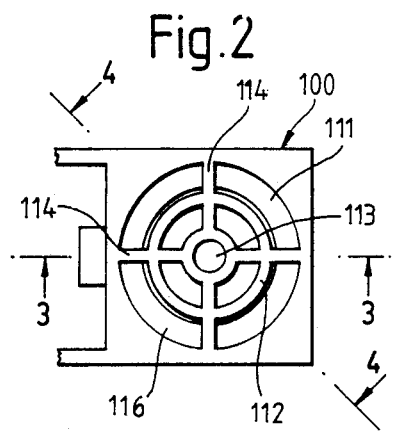
FIG. 2 is a front view of a transmitter or receiver of the apparatus of FIG. 1.
Figure 3:
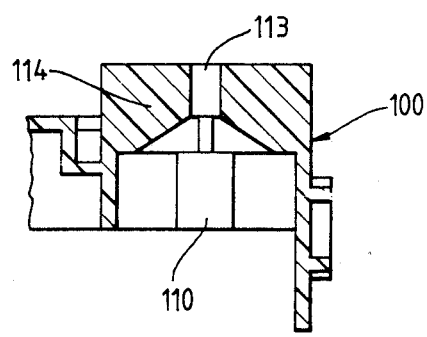
FIGS. 3 and 4 are sections on the lines AA and BB of FIG. 2.
Figure 4:
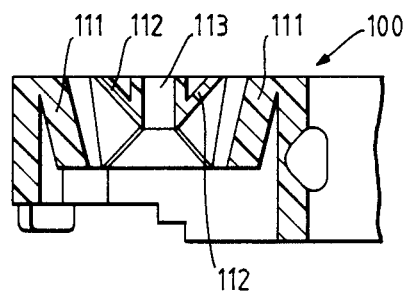

Referring to FIG. 1, there is shown apparatus for measuring distance comprising a hand held apparatus in which is mounted an electronic circuit, the top surface of the apparatus mounting an ultrasonic transmitter 11, and an ultrasonic receiver 12. The format of the transmitter 11 and receiver 12 is similar and FIGS. 2-4 illustrate this format.

A similar beam forming structure 100 is provided in front of each of transmitter and receiver transducers 110. This beam forming structure comprises an outer cone 111 and an inner cone 112 coaxial with the outer cone 111, the inner cone 112 including a coaxial hole 113 therethrough. As is clear from the figures, the outer cone 111 has a narrower conical angle than the inner cone 112. The inner cone 112 is supported by means of webs 114. This structure, can be moulded of any suitable plastics material.

The effect of this beam forming structure is to provide an annular outlet or inlet aperture 116 between the inner cone 112 and outer cone 111 with a central aperture provided by the hole 113. The beam forming structure minimises the effect of spurious echoes from side targets other than that which is to be measured. Over a short distance, the annular aperture 116 produces destructive interference at off-axis angles between about 10°-30°. The central hole 113 has been found to provide extra strength to the signal without particularly affecting the destructive interference effect. The dimensions are chosen for the particular wavelength of the ultra sound to minimise the effect of standing waves on the pulse shape.

We will now consider the effects of passing an ultrasonic pulse from the transmitter 10 to a remote reflector, the distance of which is to be measured, and back to the receiver 11.

Figure 5:
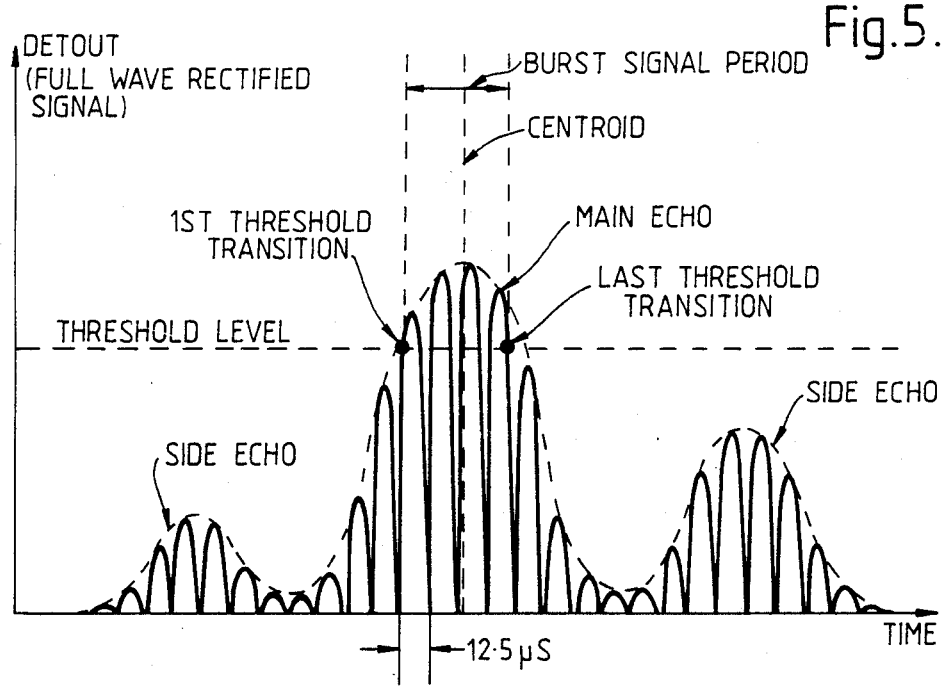
FIG. 5 illustrates the magnitude of an ultrasonic reflected signal versus time, including a main echo and two side echoes.
Figure 6:
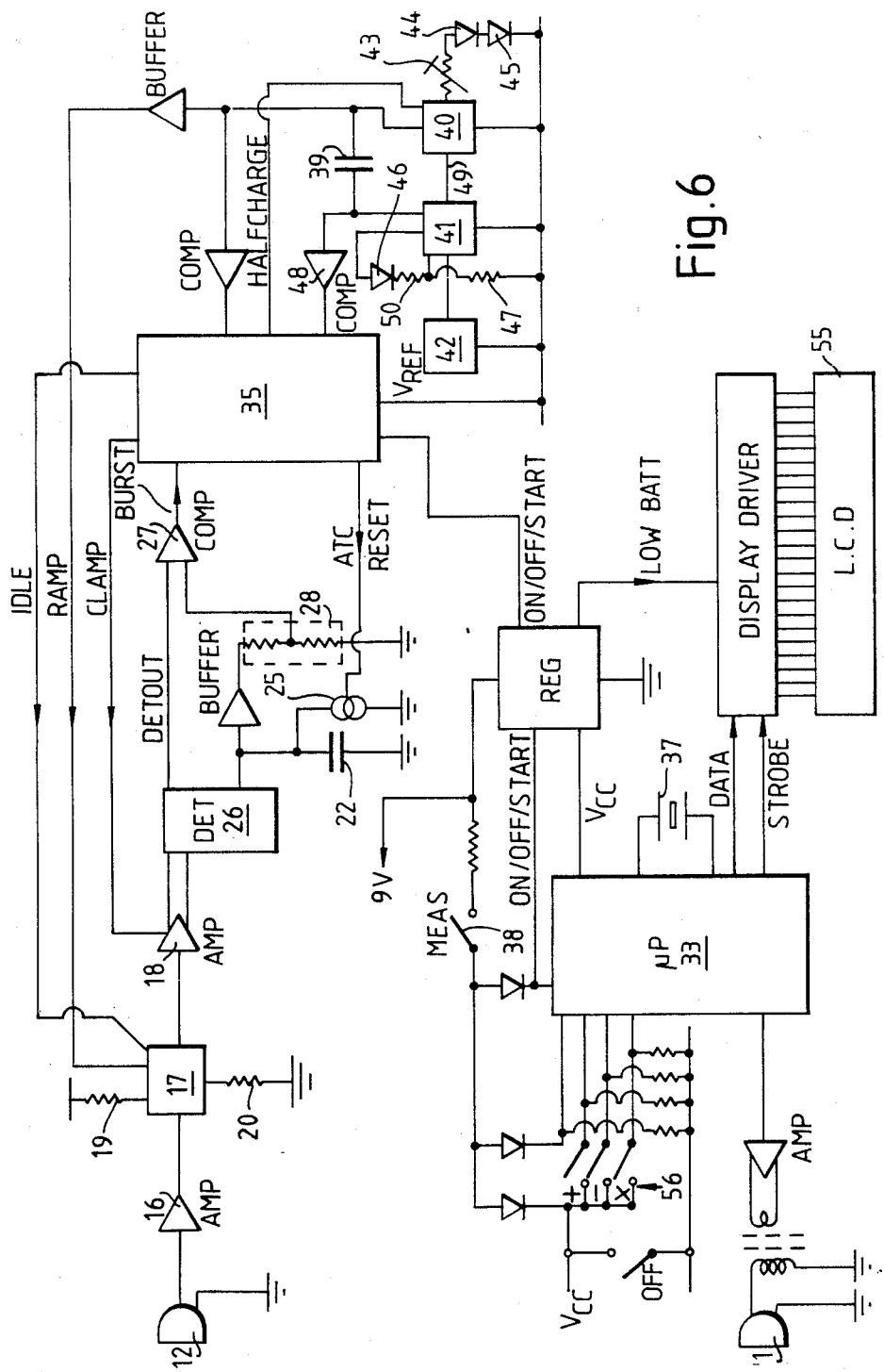
FIG. 6 is a block diagram of the circuit of a first apparatus which will determine the distance travelled by a pulse of ultrasonic energy.

Referring now to FIG. 5, there is shown the amplitude of the reflection of a burst of ultrasonic energy versus time. The amplitude function is illustrated as a series of half cycles, representing the output of a full wave signal detector as shown in FIG. 6. This is representative of the nature of bursts of narrow bandwidth ultrasonic energy which lie within a smooth envelope function. The envelope function includes a main burst and two spurious bursts of lower amplitude. The spurious bursts shown are generally representative of energy scattering from other surfaces which may have reflected a minor amount of the transmitted ultrasonic energy. In order to determine the time of occurrence of the main burst, representing reflected energy from the surface of interest, a threshold must be established which is above the peak amplitudes of the spurious bursts. If a threshold is chosen which is less than the peak amplitude of the main burst, it is possible to detect the presence of the main burst and accurately determine the timing of its centroid, or geometric centre.

It should be noted, with respect to FIG. 5, that the absolute amplitude of the main and spurious bursts will, of course, change depending on the respective distances from the reflecting surfaces. Thus, in order to detect and analyse the main burst of FIG. 1, while ignoring the spurious bursts, it is possible to normalize the signals with respect to distance and thereby determine one appropriate threshold level, which is ideally between 50 and 80%, usually about 75% of the peak amplitude of the main burst, which will allow discrimination between the main and spurious bursts independently of distance. In FIG. 5, only seven half cycles of pulsed ultrasonic energy are shown for the main burst. Of course, it could be, and is in the preferred embodiment, constituted by more than the illustrated number of ultrasonic half cycles.

FIG. 6 illustrates the electronic circuitry in the apparatus which effectively normalizes all ultrasonic reflections so that they may be analysed for a main echo, and establishes the correct threshold level. Once this threshold level is established, subsequent distance measurements may be accurately made by comparing each echo received with the established threshold level. As the envelope of the main echo will rise through the threshold level to a peak level and then fall below the threshold level, it is possible to establish timing with respect to the two threshold transitions experienced by the main echo. As will become apparent when the timing circuitry is described, this results in a measurement of the time of occurrence of the centre or centroid of the main echo.

Referring to FIG. 6, there is shown in block diagram form an apparatus which will permit determination of the correct threshold level for the received main echo of a group of reflected ultrasonic signals, as well as timing the occurrence of the centroid of the main echo with respect to the time the energy was transmitted from the device. FIG. 6 shows the two transducers. The transmit transducer 11 will, when driven by a signal derived from a microprocessor 33, radiate a burst of ultrasonic energy at a frequency determined by a crystal 37 and the microprocessor 33.

The burst of ultrasonic energy will be reflected from a distant surface and returned to the receive transducer 12. As is illustrated by way of example in FIG. 5, the returned reflected energy may include side echoes in addition to a main echo.

The output of the receive transducer 12, representing the reflected energy, is applied to the input of a preamplifier 16. Connected to the output of preamplifier 16 is a shunt attenuator 17. The shunt attenuator 17 is controlled to provide a time varying attenuation function over an approximate 60 dB range. The time varying attenuation function will start at a maximum attenuation level, and thereafter gradually decrease to zero attenuation level.

As the ultrasonic energy propagates through the air it experiences a combination of linear decay due to dispersion and exponential decay due to atmospheric absorption. Both of these effects are compensated for by the attenuator 17 which converts a linear voltage ramp into combined linear and exponential attenuation functions. The linear part is programmed by a GAIN resistor 20 and the exponential part is programmed by a DECAY resistor 19. By careful selection of these resistors it is possible to accurately normalize all the reflected signals with respect to variation of amplitude with distance travelled.

The signals from receive transducer 12, normalized by attenuator 17, are passed to the input of a main amplifier 18 which is shown as having what is described as a CLAMP input. The CLAMP input inhibits the output of the amplifier 18 until a certain amount of time has elapsed after transmission of an ultrasonic burst as will be evident from the timing diagram of FIG. 8. This is to prevent the system responding to stray pickup of energy directly radiated from the transmit transducer 12 to the receive transducer 11. The amplifier 18 has a differential output which simplifies full wave rectification in a signal detector 26 which has two outputs. One of these is used to charge an Automatic Threshold Control (ATC) capacitor 22 and the other is fed to a comparator 27 which converts the peak of the main echo to a BURST signal to be analysed by a control circuit 35.

The BURST output from the comparator 27 corresponds to the portion of the received main echo which occurs between the two threshold transitions of the main echo envelope illustrated in FIG. 5. From this it is possible to accurately determine the timing of the centroid of the received main echo.

The Automatic Threshold Control (ATC) capacitor 22 shown in FIG. 6 will memorise the peak amplitude of the main echo in order to establish the correct threshold level of approximately 75% of the peak level of the main echo signal for use in the subsequent measurement cycle. During a calibration cycle, to be described in greater detail, the ATC capacitor 22 is charged up to a voltage corresponding to the peak amplitude of the main echo. A potential divider 28 is shown for establishing the threshold level of comparator 27. Comparator 27 will sense, during a subsequent measurement cycle, the peak of the main echo pulse which exceeds the threshold level stored on the ATC capacitor 22.

An ATC RESET output signal from control circuit 35 is shown which switches on a current source 25 at the start of the aforesaid calibration cycle thereby resetting the ATC capacitor 22 to a voltage corresponding to zero signal level. This calibration cycle occurs whenever a MEASURE switch 38 (see also FIG. 1) is first pressed, and subsequently immediately after a measurement cycle fails to detect the presence of a signal.

During a measurement cycle, which commences after each calibration cycle and after each successful measurement cycle, once a threshold transition has been detected by the comparator 27, the current source 25 is momentarily switched on in order to partially discharge the ATC capacitor 22 after which it is recharged to a voltage corresponding to the peak level of the reflected signal. In this way, the voltage held on the ATC capacitor 22 is refreshed during each measurement cycle and is capable of tracking upward and downward variations of the amplitude of the main echo which are commonly experienced in practical situations involving air movement along the measurement path.

As the timings of the threshold transitions of the main echo envelope are known, it is possible to time the interval which commences with initiating a transmit burst and ends with receipt of the centroid of the main reflected signal.

The method for measuring the interval between these two events used in the present invention involves the timing capacitor 39, a charging circuit 40 and discharging circuit 41. The timing capacitor 39 is charged by a current generated by the precision charging circuit 40. The charging circuit 40 is controlled by a variable resistor 43 and temperature sensing diodes 44, 45 and 46. Basically, the temperature of the air is accurately measured and used in conjunction with variable resistor 43 to accurately set the correct charging current. In this way the effect of temperature on the speed of sound is compensated for and the voltage generated on the timing capacitor 39 is dependent solely on the distance travelled by the ultrasonic energy. Prior to the start of the charging interval, the quiescent voltage on capacitor 39 is established by a closed loop feedback circuit at a precision level represented by $V\text{INITIAL}$ which is the threshold level of comparator 48 which detects the end point of the discharge interval.

Immediately after the transmit transducer 11 has emitted a burst of ultrasonic energy, control circuit 35 will receive an ON/OFF/START signal from the microprocessor 33 which initiates the charging interval. After a period of approximately 1 millisecond an ENABLE signal from the microprocessor 33 removes the CLAMP input from the main amplifier 18 allowing received signals to pass to the detector 26.

The charging circuit 40 will initially charge the capacitor 39 at a fixed full current level. When the BURST signal is initially received by the control circuit 35, indicating that the first threshold transition has occurred, the charging circuit 40 is switched to a current value of half the previous charging current. Thus, for the duration of the BURST signal, capacitor 39 is charged at a current level of half the charging current maintained during the time interval up to the leading edge of the BURST signal.

Following the second threshold transition of the main echo pulse envelope indicated by the trailing edge of the BURST signal, capacitor 39 will cease charging and the discharging circuit 41 will be switched on permitting the determination of the distance information stored on capacitor 39.

Thus, it is clear from the foregoing that distance information is stored on the timing capacitor 39 in the form of a voltage by first charging the timing capacitor 39 at a temperature compensated full current and then at half of this current during the peak portion of the main reflected signal. The extra voltage accumulated during this half current charging interval represents a time interval equal to half the duration of the peak portion of the main reflected signal. Thus, the total voltage stored on the timing capacitor 39 is representative of the normalized time interval between the transmission of the ultrasonic burst and the reception of the centroid of the reflected signal envelope. This, in turn, is representative of the distance between the transducers and the reflecting surface.

This information is read from the timing capacitor 39 by the precision discharging circuit 41. If the capacitor 39 is discharged at a known, precisely controlled rate, the time required for capacitor 39 to discharge to its $V\text{INITIAL}$ level represents the time information stored on the capacitor 39.

The current generated by the discharging circuit 41 is determined by resistor 47 and a voltage reference 42. The resistor 50 and the diode 46 determine a temperature dependent reference voltage 49 for the charging circuit 40. As will be evident with respect to the description of FIGS. 9 and 10 to follow diode 46 cooperates with diodes 44 and 45 to form an estimate of the outside air temperature, thus permitting the time measurement to be accurately compensated for any difference between the temperature within the device and the outside air temperature.

During discharging of capacitor 39, the voltage $V\text{TIMING}$ on the capacitor is compared by comparator 48 with the voltage $V\text{INITIAL}$. When these two voltages are equal, the capacitor 39 has been discharged to its initial value.

Control circuit 35 generates two interrupt pulses which are sent to the microprocessor 33, the time interval between them representing the time to discharge capacitor 39. At the instant the discharging circuit 41 is enabled, the first interrupt pulse is sent to the microprocessor 33. The microprocessor 33 has an internal clock, accurately controlled by a quartz crystal, to permit measurement of the time interval between a first interrupt pulse and a subsequent received second interrupt pulse. The second interrupt pulse occurs when the voltage $V\text{TIMING}$ and $V\text{INITIAL}$ are equal. Thus, the time interval between first and second interrupt pulses is representative of the two-way transit distance of the ultrasonic energy which was transmitted and received by the apparatus of FIG. 2. If a calibration cycle is being performed or if no reflected signal is detected, then the charging interval is automatically terminated when $V\text{TIMING}$ reaches a predetermined voltage $V\text{OVER-RANGE}$ representing a distance greater than it is possible to measure with the apparatus of FIG. 6.

Microprocessor 33 can, of course, be conveniently programmed to convert this time interval into a distance measurement. As the velocity of sound in air and its relationship with temperature are well known, and the variation with respect to temperature is compensated for by the apparatus of FIG. 6, microprocessor 33 can compute a convenient display of the one way distance between the device and the reflecting surface in any desired units. The result of this computation is displayed on a Liquid Crystal Display (LCD) 55 (see also FIG. 1) either directly or via a LCD driver which, in the case of the preferred embodiment, is incorporated with most of the circuitry into a semi-custom integrated circuit.

Of course, it is possible to use microprocessor 33 to perform further computations involving distances, such as addition, subtraction, multiplication or combinations of these, simply by providing further inputs to the microprocessor 33 derived from switches 56 (see also FIG. 1). This would enable areas and volumes to be calculated and displayed and other functions to be incorporated such as difference calculation, totalisation and changing of units.

Figure 7:
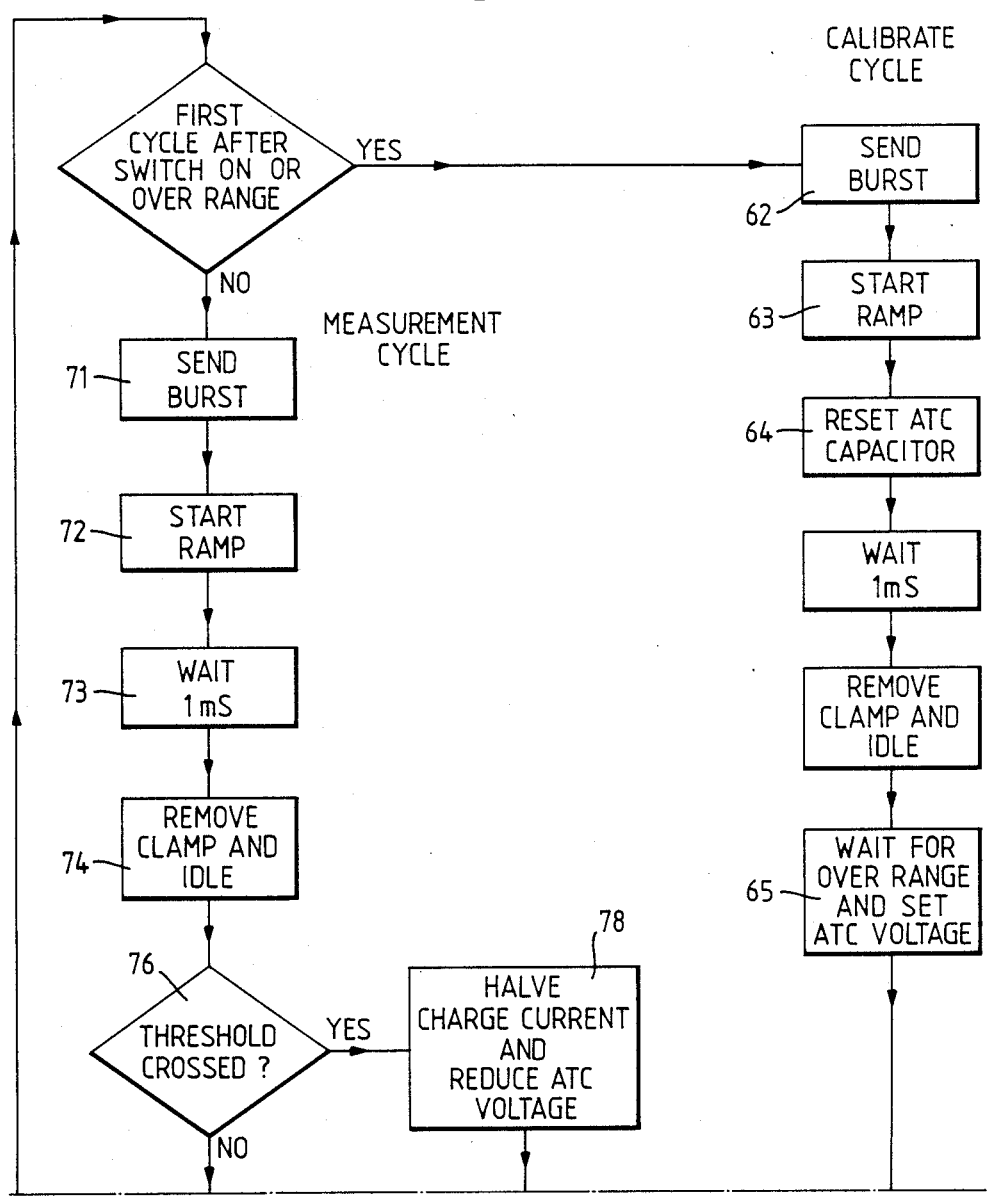
FIG. 7 is a flow chart illustrating the sequence of operation of the apparatus of FIG. 6.
Figure 8:
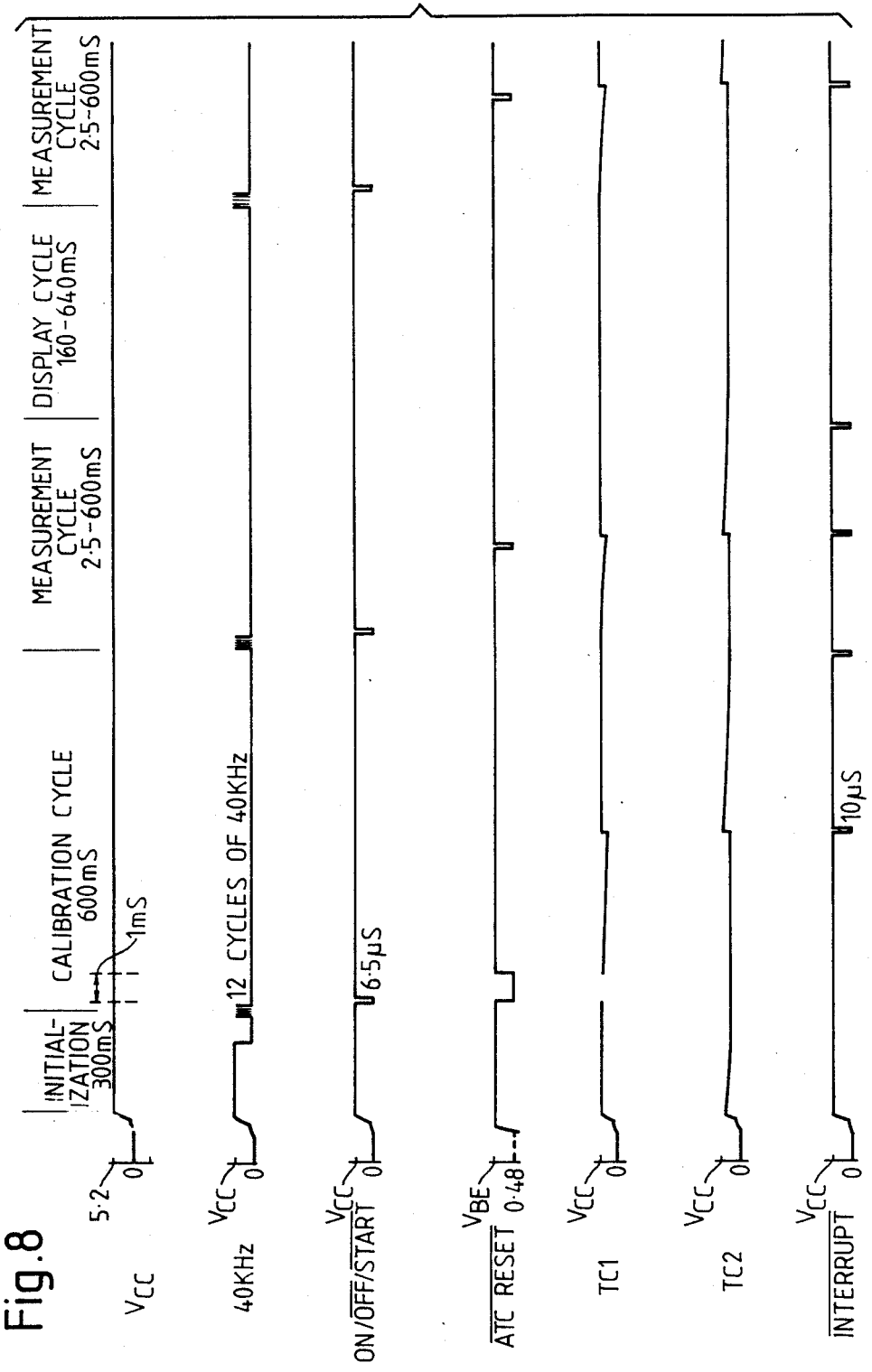
FIG. 8 illustrates the timing waveforms which are generated by the apparatus of FIG. 6 during execution of the steps of FIG. 7.

Having described the operation of the apparatus of FIG. 6 as an overview, a more detailed description will be provided by referring to FIGS. 7 and 8. Although details of control circuit 35 are not shown in FIG. 6. It will be evident from looking at the required measurement steps of FIG. 7 and the waveforms of the signals generated as represented in FIG. 8 how the circuitry can be implemented for the control circuit 35.

Referring now to FIG. 7, there is shown a flow chart which is representative of the steps executed by the apparatus of FIG. 6 in making distance measurements. Upon closure of switch 38 the apparatus of FIG. 6 will enter into a calibration cycle. At the start of the calibration cycle, a 40 kHz burst of ultrasonic energy is transmitted by the transmit transducer 11 in step 62. This is bought about by driving the transducer 11 with twelve cycles of a 40 kHz square wave generated by the microprocessor 33. As is shown in FIG. 7 at the end of the burst of twelve cycles, an ON/OFF/START pulse occurs in step 63, indicating that the burst has been sent. The control circuit 35, upon receipt of this ON/OFF/START pulse, switches on the charging circuit 40 and generates the ATC reset in step 64, which will switch on current source 25 of FIG. 6 to reset the capacitor 22 to a reference voltage shown as zero volts.

After a period of about 1 millisecond, the output of amplifier 18 is enabled by removing the CLAMP signal. Additionally, the IDLE signal is removed, permitting the attenuator 17 to provide the required maximum level of attenuation to the signal produced by receive transducer 12.

The output from the transducer 12 passes through preamplifier 16, attenuator 17, main amplifier 18 and signal detector 26 to produce the DETOUT signal of FIG. 7. This signal will charge the ATC capacitor in step 65 to a voltage level corresponding to the peak amplitude of the main signal.

Steps 63, 64 and 65 constitute the calibration cycle of the device of FIG. 6. Its function is to establish a proper threshold level on the ATC capacitor 22 to permit accurate detection of the main echo pulse. During a calibration cycle the BURST signal is inhibited so that all possible reflected signals are examined prior to the termination of the charging interval by the overrange comparator 43. After the calibration cycle 66, and the corresponding discharge period, a measurement cycle is started.

The measurement cycle is similar to the calibration cycle except that the ATC capacitor is not reset and the BURST signal is not inhibited. This allows the previously established threshold level to be applied to the detection of the main echo signal and the resulting BURST signal to be examined by the control circuit 35. Referring once again to FIG. 7, the ON/OFF/START pulse can be seen to follow the burst of 12 cycles of 40 kHz driving the transmit transducer 11.

The charging of timing capacitor 39 as represented by a ramp voltage TC1 (see FIG. 8), commences in step 72. Additionally, the ramp voltage TC1 controls the attenuator 17 to provide the required attenuation function for signals received via transducer 12.

Decision block 76 represents the determination by comparator 27 that a signal representing the main reflected pulse has been received, which has a peak amplitude greater than the threshold voltage established on the capacitor 22. This indication will reduce the charging of capacitor 39 from the full rate to half rate in step 78.

Referring once again to FIG. 8, it is clearly seen that during the BURST signal a HALF CHARGE signal is generated which causes the timing capacitor 39 to be charged at half the previous charging current level, continuing to build charge and increase in voltage, but at half the rate. After the BURST signal ends, charging of the capacitor 39 is terminated in step 80 after a fixed delay, as is shown in FIG. 7. Thus, the capacitor 39 contains a charge accumulated at one rate, representing the time from transmission of ultrasonic energy to the detection of the first threshold transition, and a charge accumulated at half the rate, representing the time between the first threshold transition and the centroid of the main echo pulse.

Once the second threshold transition has been detected in step 79 and the fixed delay has expired the timing capacitor 39 is discharged by means of the discharging circuit 41. The discharging of the capacitor 39 is represented by the voltage ramp TC2 and beings with step 82. The beginning of the discharge interval is marked by the first INTERRUPT pulse, and when the capacitor voltage $V$TIMING has decreased to a level equal to the voltage previous to the charging interval in step 83, a second INTERRUPT pulse as shown in FIG. 4 is generated. Therefore, the time interval between interrupt pulses represents the distance information stored on capacitor 39.

Steps 81 to 84 illustrate the interrupt timing, and of course, step 94 concludes with a display of the result, calculated in terms of distance using the well-known value of the speed of sound in air. Having thus described the operation of the apparatus of FIG. 6 with respect to the waveforms generated, and the sequence in which these signals are produced, it is clear that the details of the remaining circuitry of FIG. 6 will be obvious.

Figure 9:
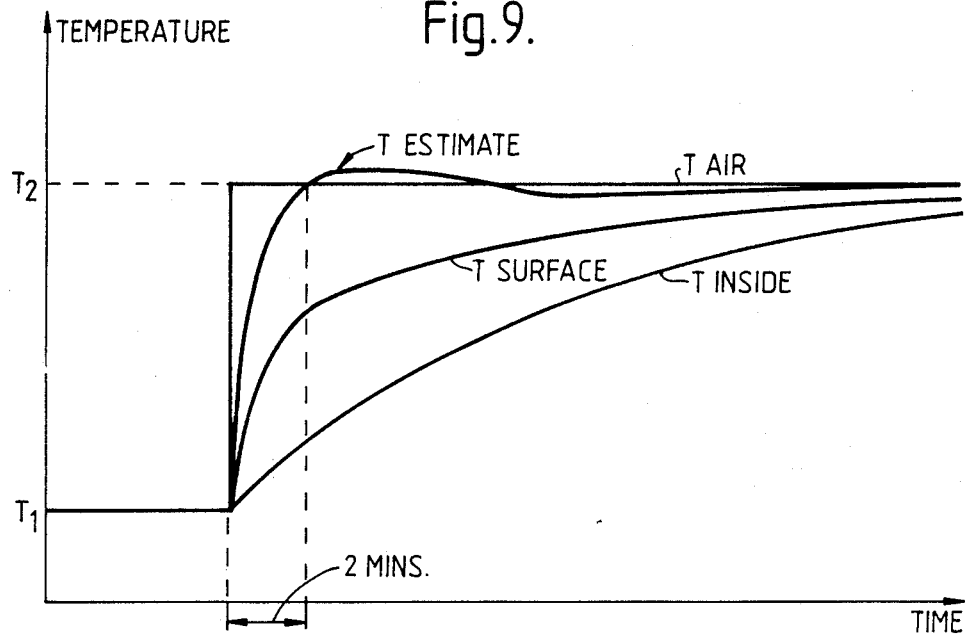
FIG. 9 illustrates the time varying relationship between the inside and outside temperatures of the apparatus of FIG. 6 and the estimated ambient temperature of the air when a step change in air temperature is experienced.

Referring to FIG. 9, there is illustrated the problem of accurate temperature compensation of the timing circuit. FIG. 9 illustrates a step change of ambient temperature experienced with moving from one environment, such as an air conditioned vehicle, into a second environment at a much higher temperature, such as outside the vehicle. Because of the thermal capacity of the device and the thermal resistance to the outside air, it will be apparent that the temperature inside the device will not come into equilibrium with the outside air until a significant period of time has elapsed, as is illustrated by curve $T$INSIDE shown in FIG. 9. Since a significant part of the aforementioned thermal resistance exists between the outside surface of the device and the surrounding air, a temperature sensor at the surface will also take a significant period of time to reach the same temperature as the surrounding air, as illustrated by curve $T$SURFACE shown in FIG. 9. Thus, to operate the device without a further degree of temperature compensation, while the device temperature is stabilizing, would provide for grossly inaccurate results.

As shown in FIG. 9, what is required is an accurate estimate of the outside temperature which can be used for temperature compensation while the device temperature is stabilizing. This estimate of outside temperature must, of course, be replaced by a more accurate measurement of the actual temperature once thermal equilibrium has been established. The estimated air temperature curve $T$ESTIMATE is derived from the curves $T$INSIDE and $T$SURFACE by weighted subtraction.

Figure 10:
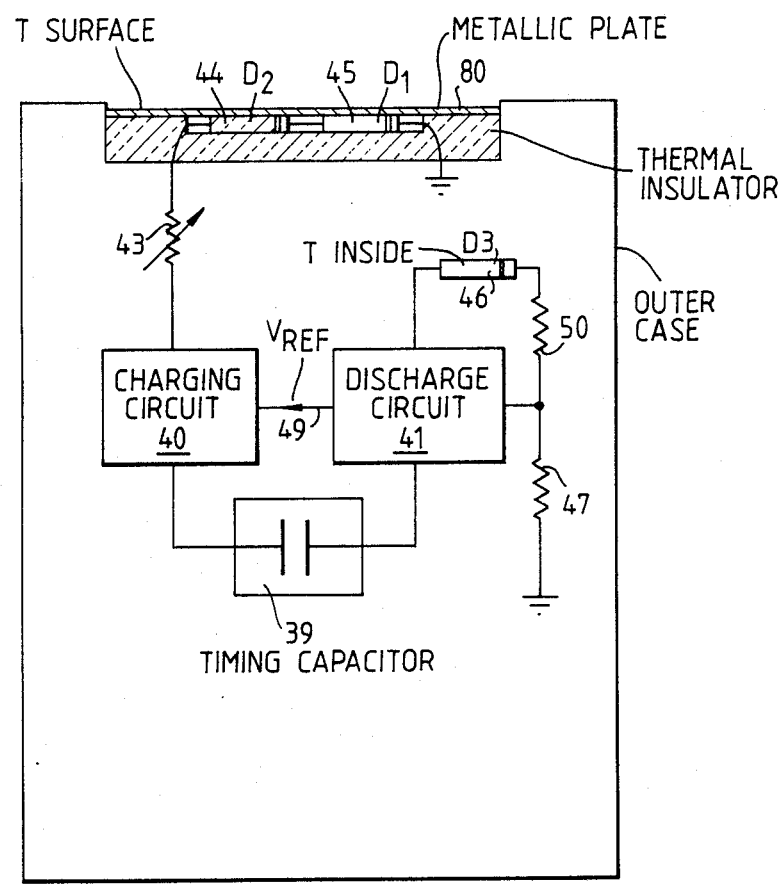
FIG. 10 illustrates a technique for estimating the ambient temperature of the air through which the ultrasonic energy used by the apparatus of FIG. 6 propagates.

FIG. 10 represents a packaging technique which is utilized to improve the accuracy of an estimate of the outside air temperature during those periods when temperature difference exists between the exterior of the case containing the apparatus and the interior. Two temperature sensing diodes D1 and D2 are representative of the diodes 44 and 45 in the apparatus of FIG. 6 and provide positive temperature control of the charging current. Additionally, diode D3 represents diode 46 of FIG. 6 and provides negative temperature control of the charging current.

The weighting of the effects of diodes D1, D2 and D3 is chosen so that the overall temperature coefficient is 0.18% per degree Celsius and also so that a best estimate of outside air temperature is obtained while the device is stabilizing. Diodes D1 and D2 are in thermal contact with a small metallic plate 80 which forms part of the external surface of the device. This plate is separated from the interior of the device by a layer of thermally insulating material. The purpose of this arrangement is to maximise the thermal resistance between the case interior and the diodes D1 and D2 and to minimise the thermal resistance between diodes D1 and D2 and the outside air. In this way the proportion of the temperature measurement which is estimated rather than directly measured is minimised.

Figure 11:
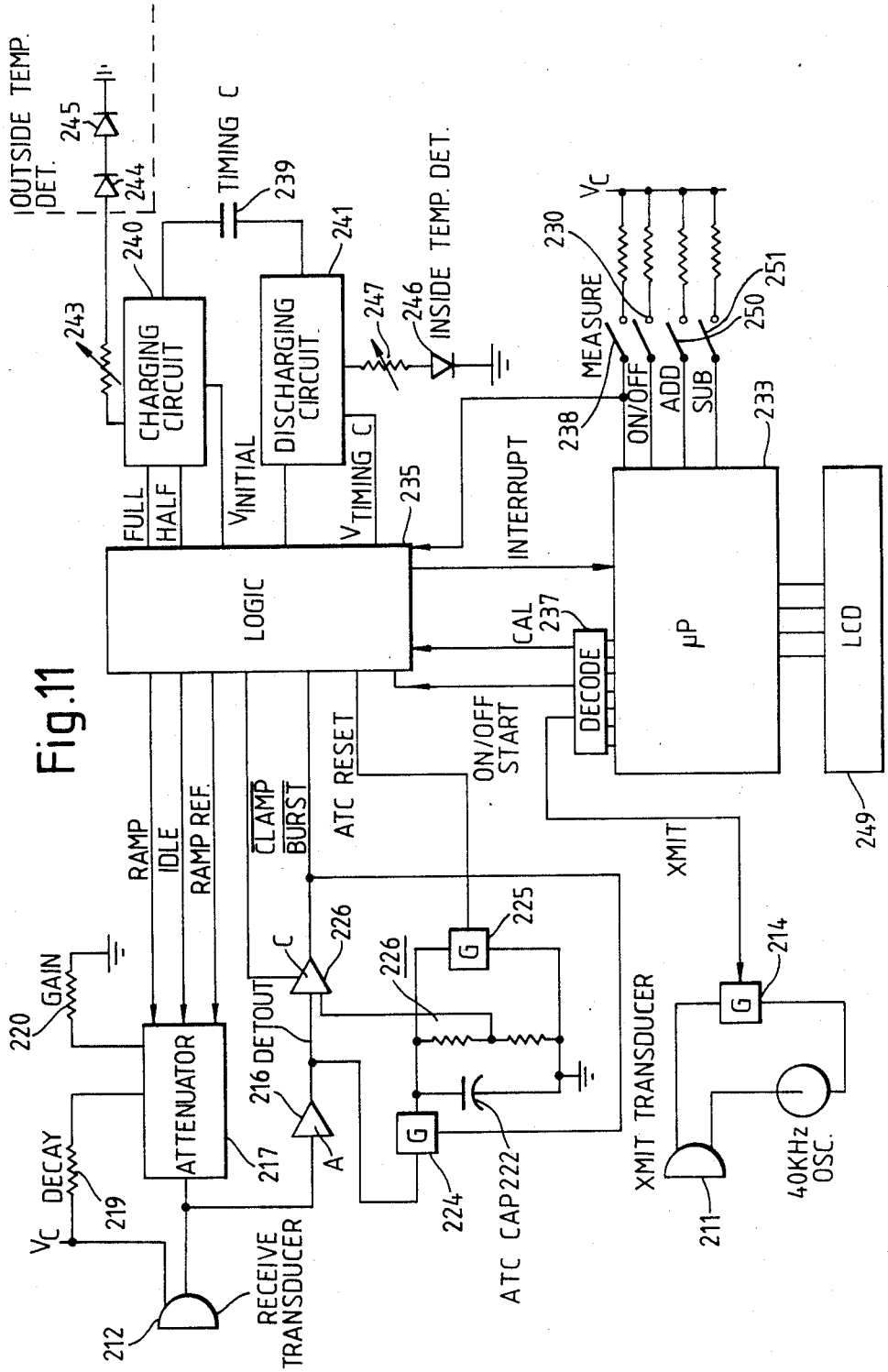
FIG. 11 is a block diagram of the circuit of a second apparatus which will determine the distance travelled by a pulse of ultrasonic energy.
Figure 12:
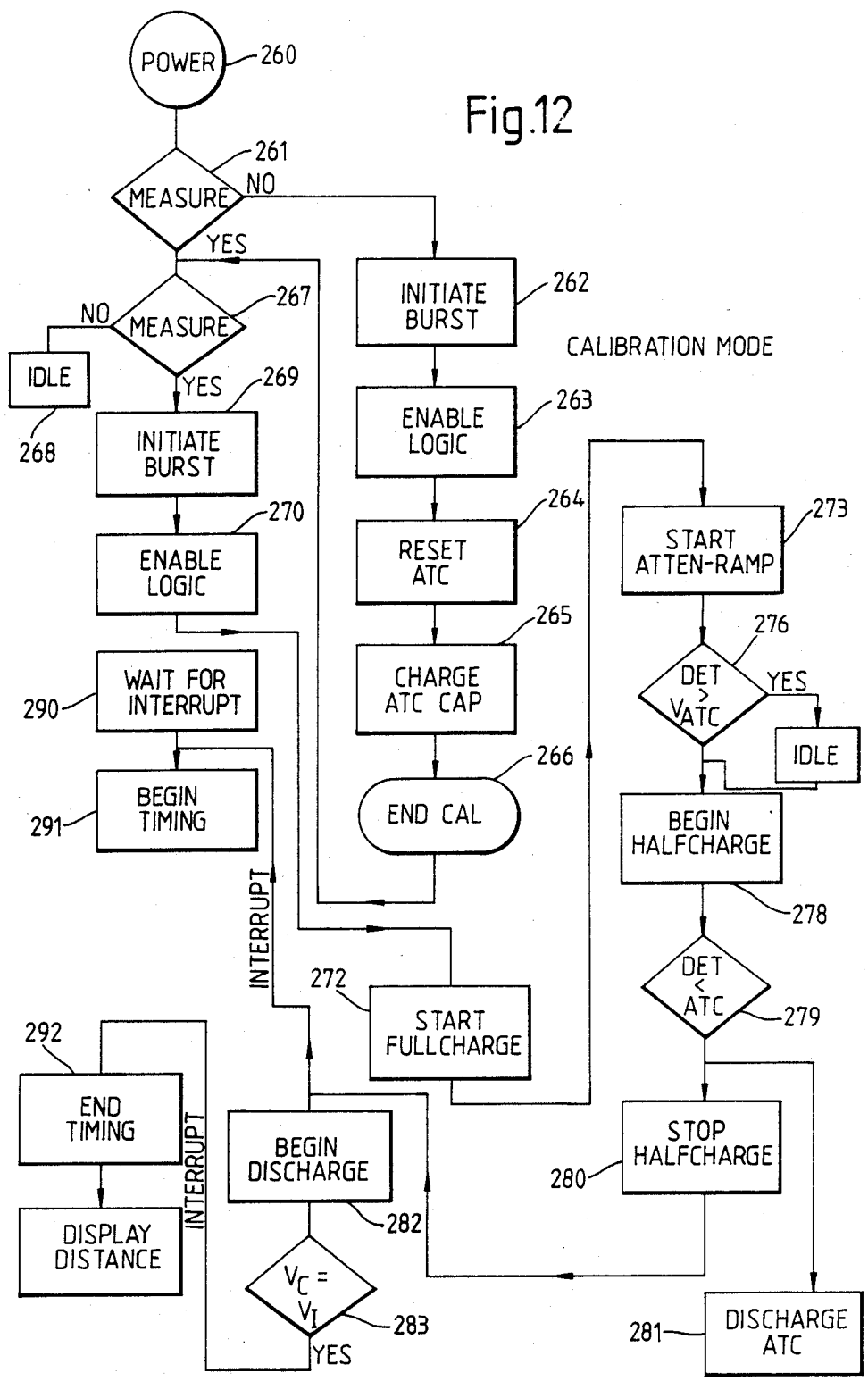
FIG. 12 is a flow chart illustrating the sequence of operation of the apparatus of FIG. 11.
Figure 13:
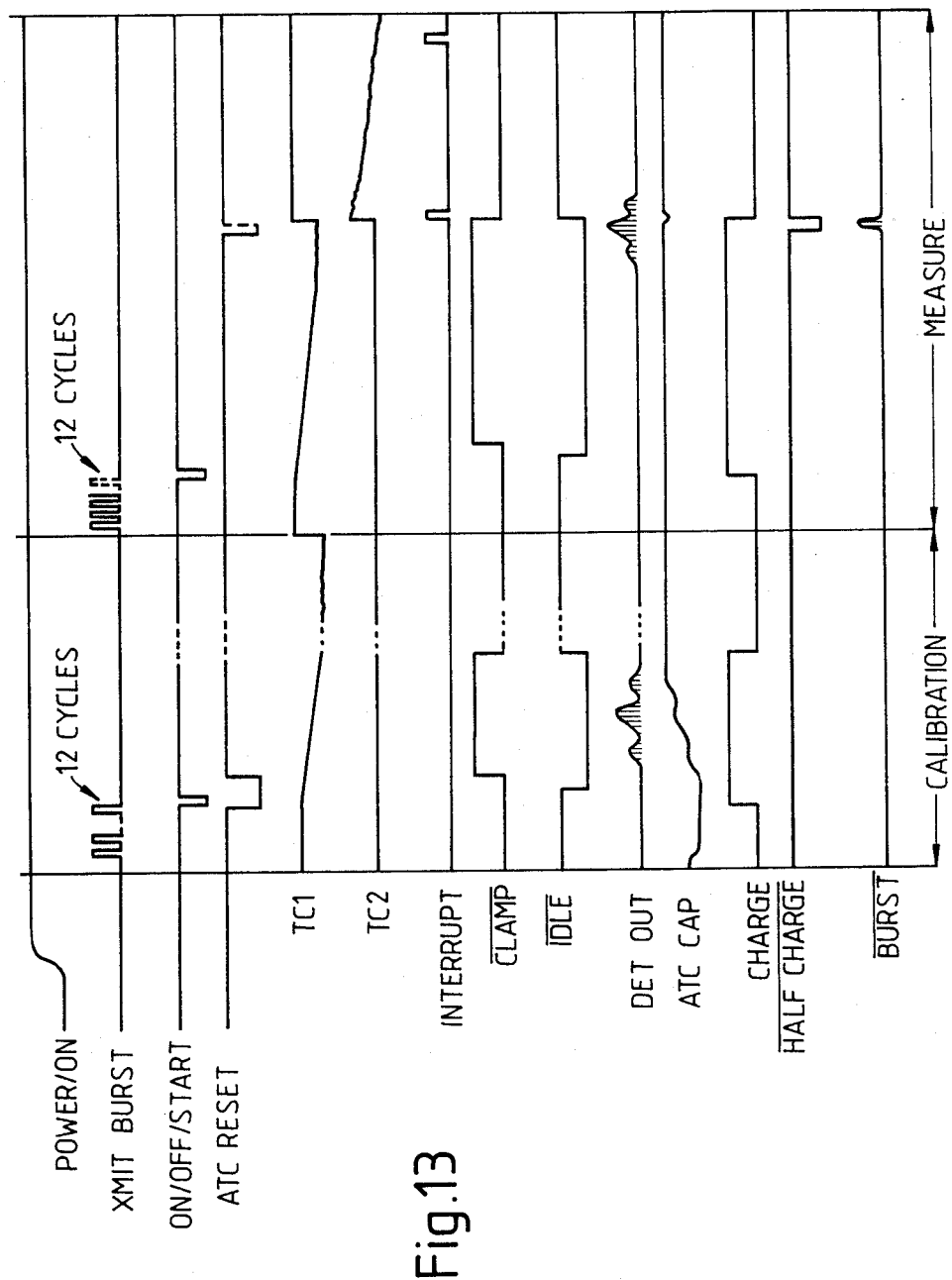
FIG. 13 illustrates the timing waveforms which are generated by the apparatus of FIG. 11 during execution of the steps of FIG. 12.

We will now describe the second embodiment of the invention illustrated in FIGS. 11 to 13 of the accompanying drawings.

The apparatus of FIG. 11 includes circuitry which will effectively normalize all ultrasonic reflections so that they may be analyzed for a main lobe, so that a threshold level can be established. Once the threshold level is established, subsequent distance measurements may be accurately made by comparing each main lobe received with the established threshold levels. As the main lobe will experience a transition from below the threshold to a peak level and then downward to below the threshold level, it is possible to establish timing with respect to the two threshold levels experienced by the main lobe. As will become apparent when the timing circuitry is described, this results in a measurement of the time occurrence of the center or centroid of the main lobe.

Referring to FIG. 11, there is shown in block diagram form an apparatus which will permit determination of a threshold for a received main lobe of a reflected ultrasonic signal, as well as timing the occurrence of the centroid of the main lobe with respect to the time the energy was transmitted from the device. As is shown in FIG. 11, there are two transducers, a transmit transducer 211 and a receive transducer 212. The transmit transducer 211 will, when gated by a signal applied to gate 214, initiate a 40 kHz burst of ultrasonic energy from oscillator 213.

The burst of ultrasonic energy will be reflected from a distant surface and returned to a receive transducer 212. As is illustrated in FIG. 5, the returned reflection includes a main lobe and probably two side lobes.

The reflection energy from the receive transducer 212 is applied to the input of an amplifier 216. Amplifier 216 is terminated at its input with a shunt attenuator 217. The shunt attenuator 217 is programmed to provide a time varying attenuation over approximately a 40 DB range. The time varying attenuation function will initially include the maximum attenuation level, and then exponentially decrease to zero attenuation level. By selecting an appropriate decay resistor 219 and a gain resistor 220 it is possible to set the attenuator to have the desired exponential attenuation curve. The required attenuation level is determined, of course, by the atmosphere absorption properties and dispersion of the ultrasonic signal during transit. It has been found that a combination of an exponential decay, as well as a linear decay, will most accurately compensate for the path loss incurred as a result of each of these effects.

As is shown in FIG. 11, the attenuator 217 is driven by a ramp voltage over a predetermined time interval.

The output of amplifier 216 will thus be normalized, i.e., reflections from more distant locations will suffer less attenuation than those from a closer in surface. Thus, the output of the amplifier 216 represents a substantially normalized signal containing the main lobe and side lobes of a received reflection.

An ATC capacitor 222 is shown in FIG. 11 which will memorize a threshold level, as is shown in FIG. 5, set to be approximately 50 to 80% of the peak value of a main lobe signal. During a calibration interval, to be described in greater detail, a gate 224 is opened to permit ultrasonic energy being received to be fed directly to the capacitor 222. A pair of resistors 227 are shown for establishing a threshold level for comparator/burst gate 226. Comparator/burst gate 226 will sense, during a subsequent measurement mode, the amplitude of the received reflections, vis a vis, the capacitor 222 voltage. When this has been exceeded by the capacitor voltage, it is clear that one of the two threshold levels for the main lobe has been detected.

The comparator/burst gate 226 is shown having what is described as a BURST output and a CLAMP input. The CLAMP input holds the comparator/burst gate 226 closed until a certain amount of time has elapsed between transmission of an ultrasonic burst, as will be evident when FIG. 13 is described. The BURST output from the comparator/burst gate 226 will transmit the received main lobe information which occurs between the two threshold points of FIG. 5. Thus, it is possible to time the received burst with respect to the first threshold level, and with respect to the second threshold level when the BURST signal is low.

An ATC reset is shown which will enable gate 225 during the aforesaid calibration sequence resetting the capacitor voltage to a known level. This calibration sequence occurs when the on/off switch for the device 230 is pressed, and the microprocessor 233 detects this closure. The detection of this closure will provide a decode on the on/off start input to the logic circuit 235. Following reset of the capacitor, an initial burst of ultrasonic energy will be received and capacitor 224 will be charged to the peak value of the received reflection.

During a measurement mode which commences when the measure switch 238 is closed, once the threshold level has been detected by the comparator burst gate 226, an ENABLE signal is applied to the gate 224 to permit capacitor 222 to be recharged to the peak level. Thus, the refresh of the capacitor 222 is accomplished during actual measurement of a reflection.

As the threshold points for the main lobe are now known by observing the peak signal level, it is possible to time the interval which commences with initiating a transmit burst and ends with receipt of the BURST signal levels.

The timing for measuring the interval between these two events is accomplished in the present embodiment by using a timing capacitor 239, a charging circuit 240 and discharging circuit 241. The timing capacitor 239 is charged using a precision charging current from the charging circuit 240. The charging circuit 240 also includes temperature compensation components 243, 244 and 245. Basically, the outside temperature is detected and used in conjunction with potentiometer 243 to accurately set a charging current level. As the charging rate determines the time lapse between transmission of ultrasonic energy and reception of a reflection, control over this current must be maintained as accurately as possible. Prior to beginning charging of the circuit 240, the capacitor 239 is established at a precision voltage level represented by $V_{INITIAL}$.

When the transmit transducer 211 emits a burst of ultrasonic energy, logic circuit 235 will receive an ON/OFF start signal. A decoder 237 decodes a START signal which occurs at the end of the transmit burst.

The charging circuit 240, upon detection of this occurrence, will initiate charging of capacitor 239 at a fixed full current level. When the BURST indication is initially received, indicating that the first threshold level has been detected, the charging circuit 240 will switch to charge capacitor 239 at half the previous charging current. Thus, for the interval of time in the reflection represented by the portion between threshold points of the main lobe, capacitor 239 is charged at the current level which is representative of the pulse train duration which is the one way transit time for the pulse.

Following the indication of the second threshold level when BURST goes low, indicating the second threshold has been detected, capacitor 239 will cease charging and the discharging circuit 241 will be enabled, permitting the determination of the timing interval information stored on capacitor 239.

Additionally, a small amount of charge is removed from capacitor 222 by operating the ATC reset for a brief duration in step 281.

Thus, it is clear from the foregoing that timing information is obtained for the timing capacitor 239 by charging the timing capacitor 239 to a voltage level representing the time interval traversed by the ultrasonic energy transmitted from transducer 211 and received by transducer 212.

An effective way of reading this information from the timing capacitor 239 is to employ a discharging circuit 241. If the capacitor 239 is discharged at a known, precisely controlled rate, the time required for capacitor 239 to discharge to its $V$INITIAL level represents the time information stored on the capacitor 239. Associated with the discharging circuit 241 is a diode 246 and potentiometer 247 which accurately control the discharging current. As will be evident diode 246 cooperates with diode 245 to form an estimate of the outside temperature, thus permitting the time measurement to be accurately compensated for any differences between the device temperature and the outside ambient temperature.

During discharging of capacitor 239, the voltage represented by $V$TIMING is compared in the logic circuit 235 with the $V$INITIAL voltage. When these two quantities are equal, it is clear that the capacitor 239 has been discharged to its initial value.

Logic circuit 235 generates two interrupts, the time interval between them representing the time to discharge capacitor 239. At the instant the discharging circuit 241 was enabled, the first interrupt was sent to the microprocessor 233. The microprocessor 233 has an internal clock, accurately controlled to permit measurement of a time interval represented by the first interrupt and a subsequently received interrupt. The subsequently received interrupt occurs when $V$TIMING = $V$INITIAL. Thus, the time required to discharge capacitor 239 to its initial value represents the two-way transit time for the ultrasonic energy which was transmitted and received by the apparatus.

Microprocessor 233 can, of course, be conveniently programmed to convert the represented time interval into a distance measurement. As the velocity of sound is well known, and compensated with respect to temperature by the apparatus of FIG. 11, microprocessor 233 can provide a convenient display of the one way distance experienced by the ultrasonic reflection. This computation can be displayed on a standard LCD 249.

Of course, it is possible with microprocessor 233 to permit a third, fourth or more switches 250, 251, which will permit subsequent measurements to be added together if a perimeter measurement or other cumulative distance measurements are to be made. Likewise, a subtraction switch 251 could be employed, or even a multiplying switch, not shown, to provide other computations or subsequent measured distances.

Having described the operation of the apparatus of FIG. 11 as an overview, a more detailed description will be provided by referring to FIGS. 12 and 13. Although details of logic circuit 35 are not shown in FIG. 11, it will be evident from looking at the required measurement steps of FIG. 12, and the waveforms of the signals generated as represented in FIG. 13, how the circuitry can be implemented for the logic circuit 235.

Referring now to FIG. 12, there is shown a flow chart which is representative of the steps executed by the apparatus of FIG. 11 in making distant measurements. A POWER ON indication 260 indicates that the switch 230 has been closed. Upon closure of switch 230, the apparatus of FIG. 11 will enter into a calibration mode. As decision block 261 indicates, the calibration mode is entered into after the on/off switch is closed and before a measurement is taken by closure of switch 238.

In the calibration mode, twelve cycles of a 40 kHz bursts are transmitted by the transmit transducer 211 in step 262. As is shown in FIG. 13, at the end of the burst of twelve cycles, an ON/OFF/START pulse occurs in step 63, indicating that the burst has been sent. The logic circuit 235, upon receipt of this ON/OFF/-START signal level will generate the ATC reset in step 264, which will enable gate 225 of FIG. 10 to reset the capacitor voltage 222 to a reference shown as zero volts, and then be changed to a voltage proportional to the peak level of a returned reflection. The comparator 226 is then enabled by the CLAMP signal. Additionally, the IDLE signal is removed, permitting the attenuator 217 to provide the required exponential attenuation to the signal provided by receive transducer 212.

The detected output from the transducer 12 is amplified in amplifier 216, and is shown as the DETOUT signal. This signal will charge the ATC capacitor in step 65 to a peak level. As the capacitor 222 was initially at a level low enough to permit comparator 226 to pass all its received signals, gate 224 will be enabled while the capacitor 222 is being charged to its peak level. Steps 263, 264, and 265, constitute the calibration cycle for the device of FIG. 11. Its function is to establish a proper threshold for the capacitor 222, permitting accurate detection of the main lobe threshold levels. At the end of the calibration 266, the return is to the decision block in the main program, waiting for a measurement button 238 to provide the required switch closure. Until such time, the IDLE mode is entered in step 268 by the logic circuit 235, holding the attenuator 217 to its maximum attenuation position.

Once a MEASUREMENT switch closure has been detected in decision block 267, a burst is initiated in step 269 by microprocessor 233 providing an ENABLE to gate 214 through the respective decode 237. At the same time, the ON/OFF/START signal is enabled by step 270. Referring once again to FIG. 13, this ON/OFF/START can be seen to follow the burst of 12 cycles of ultrasonic information.

Charging, as represented by signal level TC1 of timing capacitor 239, commences in step 272. Additionally, the attenuator ramp is enabled in step 273, permitting attenuator 217 to provide the required exponential attenuation function for signal received via transducer 212. As is also illustrated in FIG. 13, the CLAMP and IDLE signals take their appropriate state, permitting the comparator burst gate 226 to be operative, and the attenuator 217 to be operative as well.

Decision block 276 represents the determination by comparator/burst gate 226 that a signal representing received ultrasonic energy has been received, which is greater than the threshold voltage established on the capacitor 222. This indication will stop the charging of capacitor 239 at the full rate, and reduce it to half in step 278. Referring once again to FIG. 13, it is clearly seen that when the received DETOUT output signal is received, which is represented by the signal from amplifier 216, the capacitor 239 is charged at half the previous charging current level, continuing to build charge and increase in voltage, but at half the rate. When the DETOUT signal decreases to the threshold level as determined in decision block 279, charging of the capacitor at the half charge level ceases in step 280, as is shown in FIG. 13. Thus, the capacitor 239 contains a charge at one energy to the receipt of the first threshold detection, and a charge at a second rate, representing the time between threshold detections.

Once the second threshold level has been detected in decision block 279, the timing capacitor 239 may be discharged with the discharging circuit of 241. The discharging of the capacitor is illustrated by the waveform TC2 and begins with step 282. The beginning of the discharge cycle is marked by a first INTERRUPT, and when the capacitor voltage has decreased to a level equal to that previous to its charging in step 283, a second INTERRUPT as shown in FIG. 13 is generated. Therefore, the time between intervals represents a two-way time stored on capacitor 239. The beginning of this time interval is marked by the end of the twelve cycle transmission burst, and the second threshold detection.

Steps 290 through 292 illustrate the interrupt timing, and of course, step 294 concludes with a display of the result, calculated in terms of distance using the well-known relationship between the velocity of ultrasonic energy and distance.

I claim:

1. Apparatus for measuring distances comprising:
   an acoustic signal generator for directing a burst of ultrasonic frequency energy at a distant location;
   an acoustic transducer for receiving a reflected burst of acoustic energy from said distant location;
   a detector connected to said acoustic transducer, providing an electrical signal proportional to said reflected burst of acoustic energy, said electrical signal having a time varying amplitude envelope function having a main lobe with a centroid, and lower level side lobes;
   a threshold generator for generating a threshold signal equal to an amplitude value of said electrical signal main lobe which exceeds the peak amplitude of said side lobes;
   a comparator circuit means connected to receive said threshold signal, and a signal from said detector, said comparator providing a signal when said detector signal produces an envelope signal greater than said threshold signal; and
   a timing circuit connected to time at a first timing rate a first time interval which begins with the initiation of said burst of ultrasonic energy, and ends when said comparator circuit produces an output signal, and time at a second timing rate, a second interval following said first interval which ends when said comparator output signal indicates said envelope signal is less than said threshold signal, said first and second intervals representing a distance traversed by said burst of ultrasonic energy and a related reflection.

2. The apparatus of claim 1 wherein said timing circuit comprises:
   a timing capacitor;
   a charging circuit for supplying a charging current at first and second selectable current levels to said capacitor; and,
   a logic circuit connected to said charging circuit for enabling said charging circuit to charge said timing capacitor at said first rate during said first timing interval, and at said second rate during said second timing interval said comparator produces a signal.

3. The circuit of claim 2 further comprising means for reading the change in voltage potential which occurs across said capacitor during the charging of said capacitor representing said distance.

4. The circuit of claim 3 wherein said means for reading the change in voltage potential comprises:
   means for discharging said capacitor at a known discharge rate until a voltage potential is reached corresponding to an initial capacitor voltage; and,
   means for measuring the time interval over which said capacitor is discharged.

5. The circuit of claim 1 further comprising:
   an attenuator connected across said acoustic transducer for changing the level of a signal produced by said transducer; and,
   a second timing circuit for controlling said attenuation level as a function of time.

6. The circuit of claim 5 wherein said attenuation level decreases over time.

7. The circuit of claim 5 wherein said attenuation level varies exponentially over time.

8. The circuit of claim 1 further including a digital display means for displaying a measured distance based upon said measured time interval.

9. The circuit of claim 4 further comprising temperature compensation means for controlling said discharge current to compensate for a step change in temperature experienced by said apparatus.

10. The circuit of claim 9 wherein said temperature compensation means includes:
    a first diode circuit located in a package containing said apparatus, connected in series with a reference current path of said discharge circuit; and
    second and third diodes thermally coupled to the exterior of said package and serially connected with a reference current path of said charging circuit.

11. Apparatus for measuring distances comprising:
    (a) an acoustic signal generator for directing a burst of ultrasonic frequency energy at a distant location;
    (b) an acoustic transducer for receiving a reflected burst of acoustic energy from said distant location and producing an output signal proportional to the amplitude of said reflected burst of acoustic energy;
    (c) a threshold detection circuit connected to said transducer for generating an output signal when said transducer produces an output signal in excess of pre-established threshold voltage;
    (d) a timing capacitor;
    (e) a charging circuit connected to charge said capacitor at a predetermined charging rate, said charge being initiated when said burst is generated by said signal generator, and being concluded when said threshold detection circuit produces an output signal, whereby a voltage potential is stored on said timing capacitor proportional to a measured distance;

(f) a discharging circuit connected to discharge said timing capacitor at a fixed discharge rate;

(g) logic circuit connected to said discharging circuit for initiating a first interrupt pulse when said capacitor begins to discharge, and a second interrupt pulse when said capacitor discharges to an initial value;

(h) a microprocessor connected to receive said first and second interrupts, programmed to measure a time interval represented by first and second interrupt pulses, and convert said time interval into a distance measurement traversed by said burst of acoustic energy; and, (i) a display connected to said microprocessor for displaying said distance measurement.

12. The apparatus of claim 11 further comprising:
an attenuator connected to said acoustic transducer for controlling said transducer output signal amplitude; and,
a timing circuit for controlling the attenuating of said attenuator over a time period beginning with the generation of said burst of ultrasonic energy.

13. The apparatus of claim 12, wherein said attenuator produces an attenuation which varies exponentially over time.

14. The apparatus of claim 12 wherein said attenuator produces an attenuation which varies linearly as well as exponentially.

15. The apparatus of claim 1 wherein said second rate is half the first rate.

* * * * *